United States Patent Office 3,171,384
Patented Mar. 2, 1965

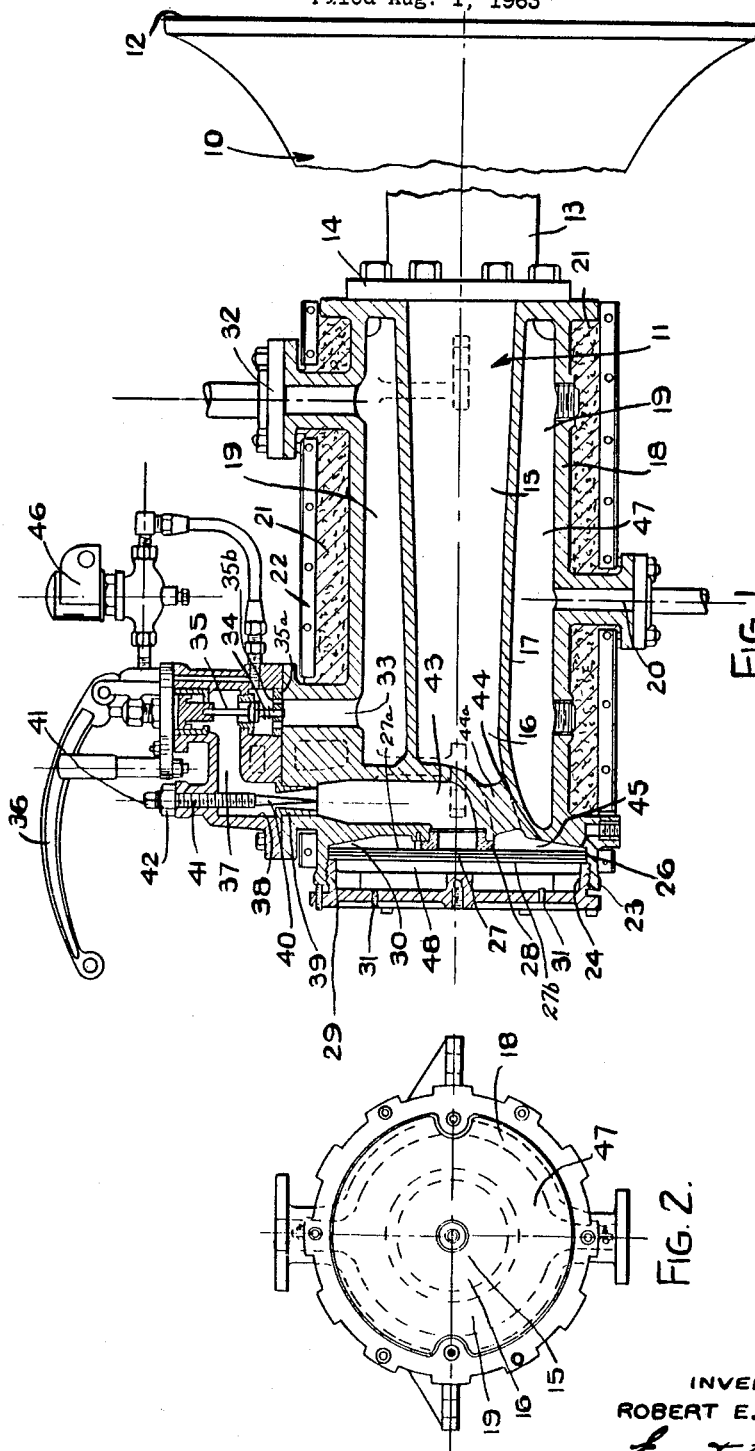

3,171,384
STEAM OPERATED HORN
Robert E. Swanson, 5212 Granville St., Vancouver,
British Columbia, Canada
Filed Aug. 1, 1963, Ser. No. 299,283
Claims priority, application Great Britain, Aug. 9, 1962,
30,475/62
11 Claims. (Cl. 116—142)

This invention relates to sound producing devices, particularly to improvements in a steam operated horn or whistle.

As usually constructed horns which operate by the passage of steam under pressure employ some type of diaphragm which is caused to vibrate, producing sound when steam under pressure is caused to pass through the device. Such diaphragms are constructed and installed in various manners well known to the art, but the manner in which the steam is introduced to the diaphragm in order to do its work has, in the past, caused serious difficulty as the steam normally contains large amounts of condensate when it enters the device, and by the time the steam reaches the diaphragm the water and steam, due to turbulence, has become a mass of steam super-saturated with condensate, the water remaining in suspension due entirely to the movement and velocity of the steam passing through the device. This causes a steam horn to hesitate and not to emit a clear concise signal as required by the laws governing steam ships and the like.

Consequently, to overcome the above difficulties, it is an object of this invention to provide a horizontally disposed horn operated by steam in which the natural laws of gravity and the laws of expanding steam are combined in such a manner that the condensate is separated within the device, and at the same time any minute particles or droplets of condensate are atomized and re-evaporated back to steam immediately prior to the steam impinging upon the diaphragm to do its work.

A further object is to provide a steam horn that emits a clean crisp note which is exceedingly loud but which lacks the muffled sound usually associated with steam operated sounding devices.

Another object is to provide a steam horn in which the volume of steam reaching the diaphragm can be adjusted to complement the tension on the diaphragm and thus provide a condition in which a peak occurs and consequently a very loud signal.

Another object is to provide a steam horn which uses a minimum of steam to provide an extremely loud and powerful signal.

Another object is to provide a steam horn which can be manufactured economically to a standard specification; but which can be readily adjusted to suit any required pressure and steam conditions.

Another object is to provide a steam horn in which the diaphragms and parts will have a long life.

Briefly, the invention includes a combination to be found in a steam operated horn, such device having a horn forming a sound resonant column, said horn open at one end and having an annular seating ring at the other end thereof including a chamber within the said annular seating ring as well as a passage for supplying steam under pressure to the said chamber to act on a diaphragm and resonate in the horn. The said passage being connected to the steam supply through a diverging nozzle having a needle valve in adjustable axial relation thereto to form an adjustable Venturi tube, for the aforesaid atomizing purpose. A portion of the horn body and the diaphragm casing is surrounded by an annular chamber or steam jacket, into the top front end of which is introduced steam from a boiler, and out of the top back end of which steam is introduced through an operating valve into the afore-mentioned combined Venturi nozzle and needle valve adjustment to act upon a diaphragm. A drain connected to a steam trap leads from the bottom centre of the said annular chamber which surrounds the horn body.

Prior to this invention steam horns were conventionally constructed so the steam from the boiler was led into the bottom of an annular chamber, or steam jacket, surrounding the horn body, and led from the top or side of this chamber into a control valve which fed directly to the diaphragm chamber. Baffles were sometimes incorporated in the annular chamber in an attempt to separate the condensate from the turbulent mass of steam and water which existed in this annular chamber upon the high-velocity passage of steam when the horn was sounded. Heretofore, no provision was made for an atomizer and reheating chamber in the steam passage between the annular chamber or steam jacket and the diaphragm chamber.

Other objects of the invention and features of novelty will be apparent from the following description taken in connection with the accompanying drawings in which:

FIGURE 1 is a longitudinal section of a steam horn according to invention, the external horn portion not being shown in section.

FIGURE 2 is an end elevation of the body portion.

As shown in FIGURE 1, the steam operated sound producing device comprises the external horn portion 10 to which is attached the body portion indicated generally by the numeral 11. The portion 10 has the wide mouth 12, the constricted part 13, and the flange 14, for obvious attachment of the body portion aforesaid.

The body 11 has the internal hollow part 15 tapering to the throat 16. It is seen that 16, 15, 13, 10 form the full horn portion, which suitably is of exponential or catenoidal form, well known in the art.

The said full horn portion is horizontally disposed.

Internal hollow part 15 has the wall 17 which wall, together with an outer wall 18, define an outer annular space 19 surrounding the inner hollow part 15, which space 19 forms a steam jacket. At the bottom of the space 19 is the drain 20 leading to a conventional trap not shown. Obvious lagging 21 is provided for heat insulation purpose, retained by the cover 22.

The end of the body 11 remote from the external horn portion 10, is enlarged somewhat to form the housing 23 into which suitably is screwed the end plate casing 24. Housing 23 is recessed as shown at 26 to receive the diaphragms 27. While a single diaphragm may be used, two or more are usually provided. The FIGURE 1 embodiment has three contiguous diaphragms 27, of which the inner has a surface 27a facing the mouth 12, and the outer has an outer surface 27b. Said diaphragms are concave outwards when unstressed. Central of the diaphragms is a hollow flanged seat 28. Thus, when the end plate casing 24 is screwed inwards, a flange 29 thereof bears against the outer edge of the diaphragm surface 27b forcing the inner diaphragm surface 27a against the seat 28. Because of the concave shape aforesaid, this action will strongly stress the diaphragms. There is clearance between the edge of the diaphragm surface 27a and the adjacent body wall as indicated at 30, thus means are provided adjustably to stress the said diaphragms according to the extent that the end plate 24 is screwed inwards. It is seen that the diaphragm surface 27a thus is in contact only with the seat, and the surface 27b only with the flange 29. Said plate is provided with vents 31 communicating with the atmosphere.

Steam under suitable pressure enters the steam jacket 19 through an inlet 32, which inlet is located to communicate with the top of the steam jacket space adjacent the end thereof remote from the diaphragms 27. Steam leaves the jacket through an outlet passage 33 communicating with the top of the jacket adjacent the end thereof nearer the diaphragms. The upper extremity of the outlet passage 33 is provided with a conventional spring closed valve 34 having the stem 35 obviously actuated by the lever means 36 so that, said lever 36 being depressed, steam will pass from 33 to the chamber 37. The lower end of the valve stem 35 is retained by a member 35a at the top of passage 33, which member 35a has a number of holes 35b for the passage of steam through the passage 33 from the steam jacket 19.

Well known solenoid electrical means, 46, may be provided to operate the valve 34.

Steam from the outlet passage 33 passes through a generally horizontal chamber 37 having a vertically dependent portion 38, the base thereof provided with a conical inset 39, a diverging nozzle, to form, with the needle valve 40, a Venturi tube. The shaft of said needle valve is threaded as shown at 41 passing through the upper wall of the chamber 37 drilled and tapped to receive the said shaft. A locknut 42 is provided as shown, whereby the position of the needle valve within the Venturi having been adjusted, the shaft may be locked in that position. Below the diverging nozzle 39 is an expansion chamber 43 formed within the body end wall 44, the annular seat 28 forms (with the diaphragms) an end closure to said expansion chamber. Thus, upon the lever 36 being depressed, steam under pressure will force the diaphragms 27 outwards, off the seat 28. As is well known, the diaphragms will then commence to vibrate and continue so to do until the valve 34 is closed, cutting off the supply of steam.

It will be seen that the body portion 11 has the end wall 44, and that the same defines, with the inner diaphragm surface 27a the generally annular space 45. The steam is discharged from said space through end wall passages 44a to the throat 16.

As has been stated, 16, 15, 13, 10 form an exponential or catenoidal resonant horn structure. The pitch of the sound depends upon the frequency of vibration of the diaphragms. This is determined by a number of factors such as, the steam pressure and velocity, the stress upon the diaphragms (adjustable as aforesaid by means of the end plate 24), and, other things being equal, the sound emission approaches a maximum when frequency of the diaphragm approaches horn resonance. These matters are well known and understood in the art.

It will be noted that expansion chamber 43 is terminated on the one end by the combination of a diverging nozzle 39 and a tapered needle valve 40, the effect of which is such as to induce a high velocity into steam passing therethrough to enter the expansion chamber 43. It will also be noted the expansion chamber has an end wall formed by the inner diaphragm surface 27a when it is abutting seat 28. It will be further observed that communication between expansion chamber 43 and horn throat portion 16 can only be established when the central portion of diaphragm has been moved to the left, compressing the atmosphere in the space 48 on the left of the diaphragms 27.

As has been stated, a space 19 is formed between horn body wall 17 and outer body wall 18, which space functions as a steam jacket since boiler pressure is allowed to exist therein, since the passage 33 aforesaid is in communication with a boiler, or a source of steam at suitable pressure.

It will also be noted from FIGURE 1 that the supply of steam is caused to enter the steam jacket space 19 at the top thereof via passage 32, and that the steam passes in a downward direction, the natural direction in which a drop of water would fall under the action of gravity. It will be further noted that water may settle in the bottom of the steam jacket 19, in the position indicated by the numeral 47, where there are no violent currents of steam, and steam action is quiescent since any impingement of steam is broken by the horn wall 17. Water or condensate thus extracted from the steam in chamber 19 is drained away by gravity to a steam trap, not shown, connected to the device by the drain connection 20.

From FIGURE 1 it is evident that the steam in the top left-hand corner of chamber 19 would be relatively dry, provided drain 20 were functioning in a proper manner. It also will be noted that the passage 33 is vertical and leads from the top left-hand (dry) corner of steam jacket space 19, to the spring-loaded control valve 34, said valve also being urged to the closed position by the pressure of the steam within the chamber 19. It will also follow that if saturated steam at, e.g., 150 p.s.i.g., is contained in 19, the temperature therein will be 366° F., and that, provided the outer wall 18 is insulated as by the lagging 21, the temperature in chamber 43 will approach the above. Now if lever 36 is depressed, dry saturated steam from the steam jacket space 19 will then flow through the valve 34 and to chamber 37. Due to the restriction of the needle valve 40 in the throat of the conical nozzle 39, the steam pressure and temperature in 37 will be substantially as in chamber 19, and, further, inasmuch as the temperature of the walls of said chamber is substantially the same as that of the steam therein, little condensation, with resulting moisture, occurs. It follows, therefore, that saturated steam of nearly the same dryness as the steam in the chamber 19 will enter the diverging nozzle 39. The steam will thus wire-draw, or throttle, at this point and expand freely without doing work; and as heat is neither added nor taken away the expansion will be sensibly adiabatic. It will be understood that, notwithstanding the steam in the jacket 39—particularly in the vicinity of the outlet passage 33—is dry or nearly so, it is a vapor in contact with its liquid and, so, may contain droplets of moisture. Such droplets are "atomized" in passing through said needle valve nozzle combination. As the steam is expanding without receiving or rejecting heat, it will become drier and, under these conditions, any droplets of moisture which have been atomized in passing through the nozzle 39 will immediately be re-evaporated back into steam. If, under these conditions, all the free moisture present is re-evaporated, or if the steam be fully dry to commence with, the steam will become super-heated after the expansion. This action on the part of the steam can be expressed as follows:

Let $P_1$ = initial pressure of the steam before throttling.
$P_2$ = final pressure of the steam after throttling.
$H_1$ = total heat of the saturated steam per pound at pressure $P_1$.
$H_2$ = total heat of saturated steam of the same quality per pound at pressure $P_2$.

Then $H_1$ is greater than $H_2$ and, since no heat is supplied or taken away during the unrestricted expansion, it follows that for each pound of steam $(H_1-H_2)$ heat units are available for drying the steam if it were originally wet, or for super-heating the steam if it were originally dry; and, further, if $(H_1-H_2)$ heat units are more than necessary completely to dry the steam, the excess will be available for super-heating.

If the steam be wet after throttling we have, per pound

Heat before throttling = heat after throttling $$H_1 + x_1 L_1 = h_2 + x_2 L_2$$

where the subscripts 1 and 2 refer to the condition of the steam before and after throttling respectively, $x$ = the dryness fraction of the steam
$L = 1114 - 0.7t$ B.t.u.
$t$ = temperature of saturation in degrees F.

If the steam is super-heated after throttling we have, per pound, $$H_1+L_2=H_2+0.48\ (t_3-t_2)$$

Where:

$t_3$=temperature of steam after throttling.
$t_2$=temperature of saturation corresponding to pressure $P_2$ after expansion (from table).
$h_1$=sensible heat at pressure $P_1$ before expansion.
$L_1$=latent heat of steam at pressure $P_1$.
$x$=dryness fraction of steam at pressure $P_1$.

From the foregoing it is evident that where steam is expanded adiabatically in an expansion chamber conducive to adiabatic expansion, the latter depending upon the dryness fraction of the steam before throttling. It is therefore beneficial to my invention to separate as much free condensate and moisture particles from the steam as possible before the steam enters the adiabatic expansion chamber. In my invention this is best accomplished by introducing the steam into the steam jacket (from whence it is led to the adiabatic expansion chamber) at the diametrical top at a substantial distance from, but on the same plane as the steam outlet, and so arranged that the inlet points in the direction of gravity, and the steam outlet points in the direction opposed to gravity. It is also advantageous to my invention that the drain from the steam jacket be located as remote as possible from the steam inlet and that it point in the direction of gravity. The passage from the steam jacket, through the operating valve and into the atomizing expansion nozzle should be as direct as possible, and the metal walls of this passage should be in direct contact with the live steam in the steam jacket.

It is recognized that a further and more severe expansion of the steam takes place as the steam passes from the adiabatic expansion chamber between diaphragm 27 and annular seat 28, when the diaphragm is vibrating and the horn is sounding, but it must be borne in mind under these conditions the steam is giving up heat units in expending its energy and doing work in overcoming the inertia of the diaphragm and causing it to vibrate against the acoustical impedance of horn column.

I have found that, when free moisture exists between diaphragms 27 and the annular seat 28, as the horn is sounding the motion of the diaphragm is seriously impeded, so much so that the tone of the horn under these conditions is muffled, and if sufficient moisture is present at this point the horn does not sound properly until the water has been blown out. A further difficulty is experienced with water present between the diaphragms 27 and annular seat 28 when it is realized that some of the water must be re-evaporated into steam at 212° F. in the horn column. This again seriously interferes with the proper sounding of the horn and muffles the tone, as the horn column becomes over-loaded with wet vapour. My invention overcomes this difficulty by providing steam of the proper quality adjusted to the proper quantity to effect a maximum of vibration, and consequently a maximum of sound.

Steam horns prior to this invention were constructed so that the steam was led into the bottom of the steam jacket in a direction opposed to the action of gravity, and any water which had settled from the steam was thus violently agitated by the high velocity entrance of steam into the lower portion of the steam jacket. When such a device was sounding the entire mass of steam in the steam jacket was a seething, turbulent mixture of saturated steam and free particles of condensate. This was carried over to the diaphragm where expansion took place after the mixture passed the diaphragm. The initial blast from such horns usually took a few seconds for the horn to clear its throat, and often the note emitted was tremulous due to re-evaporation taking place in the resonant horn column. This condition was aggravated where long steam lines existed between the boiler and the whistle, as droplets of condensate in such lines were carried at high velocity through the jacket steam space of the horn and into the diaphragm assembly. I have found that when such horns are adapted so as to utilize the features of this invention they can be made to perform in a satisfactory manner, and that hesitation on the initial blast can be eliminated, the tone can be cleared up, and the amount of steam consumed can be reduced. This results in better performance and lowered maintenance costs.

To adjust the device the maximum effectiveness, use should be made of a decibel meter. The horn operating, the needle valve may be adjusted for maximum db reading, then the diaphragms may be adjusted, as explained, for a new peak. This procedure is repeated until maximum output is attained. As has been explained, this will occur when the frequency of vibration of the diaphragm approaches horn resonance.

What I claim is:

1. A steam operated sound producing device having a horizontally disposed hollow horn element having a body portion tapering internally to form a throat, said body portion having a side wall, and an end wall adjacent said throat; surrounding the body portion a steam jacket, defined by an external wall having a top portion and a bottom portion, the body portion side wall, a first end wall adjacent the body end wall aforesaid, and a second end wall remote therefrom; in the bottom of the jacket external wall a drain adapted for attachment to a steam trap; a vertically disposed steam inlet passage in the top of the jacket external wall adjacent the second said jacket end wall; further characterized by the combination including:

(a) adjacent the aforesaid first jacket end wall, a vertically disposed steam outlet passage extending through and beyond the top of the jacket external wall, valve means adapted to open and close said steam outlet passage;

(b) a chamber communicating with said steam outlet passage constructed and arranged so that said valve controls admission of steam to the chamber;

(c) the chamber having a base, in the base a diverging conical nozzle whereby steam passing therethrough expands, means to adjust the size of the diverging nozzle;

(d) the body end wall having a central hole, a hollow flanged seat element in said hole, said end wall having a recess adapted to receive a diaphragm;

(e) formed within the body end wall vertically below said nozzle, an expansion chamber, the said hollow flanged seat element adapted, with the diaphragm, to form an end closure to the expansion chamber;

(f) and an end plate casing having a flange adapted to cooperate with said recess, constructed and arranged so that said flange shall bear against an outer annulus of a diaphragm received by the recess to urge the diaphragm against said seat, whereby the diaphragm is in contact only with said flange and said seat.

2. The device as claim 1, an axially movable needle valve to adjust the size of the diverging nozzle.

3. The device as claim 2, the end plate casing flange adapted to be screwed into the cooperating recess adjustably to urge the diaphragm against the flange.

4. The device as claim 3, the diaphragm initially concave outwards so that it tends to flatten as the end plate casing is screwed inwards.

5. The device as claim 4, the diaphragm having an inner surface, clearance between said inner surface and the body end wall recess whereby the diaphragm is in contact only with said seat and the end plate casing flange.

6. The device as claim 5, and heat insulating lagging surrounding the external wall of the steam jacket.

7. The device as claim 6, and solenoid means to actuate said steam outlet passage valve.

8. The device as claim 1, and heat insulating lagging surrounding the external wall of the steam jacket.

9. The device as claim 8, the end plate casing flange adapted to be screwed into the cooperating recess adjustably to urge the diaphragm against the flange, the diaphragm initially concave outwards so that its tends to flatten as the end plate casing is screwed inwards.

10. The device as claim 9, the diaphragm having an inner surface, clearance between said inner surface and the body end wall recess whereby the diaphragm is in contact only with said seat and the end plate casing flange.

11. The device as claim 10, and solenoid means to actuate said steam outlet passage valve.

References Cited by the Examiner

UNITED STATES PATENTS

| | | | |
|---|---|---|---|
| 1,614,858 | 1/27 | Wenz | 116—142 |
| 1,660,785 | 2/28 | Cooper | 116—142 |
| 1,892,016 | 12/32 | Soderberg | 116—142 |
| 2,240,119 | 4/41 | Montgomery et al. | 251—124 |
| 2,386,513 | 10/45 | Soderberg | 116—142 |

FOREIGN PATENTS

| | | |
|---|---|---|
| 160,198 | 12/54 | Australia. |
| 671,231 | 4/52 | Australia. |

LOUIS J. CAPOZI, *Primary Examiner.*